United States Patent [19]
Morales

[11] Patent Number: 5,663,757
[45] Date of Patent: Sep. 2, 1997

[54] SOFTWARE CONTROLLED MULTI-MODE INTERACTIVE TV SYSTEMS

[76] Inventor: Fernando Morales, 1941 Roland Clarke Pl., Reston, Va. 22091

[21] Appl. No.: 674,169

[22] Filed: Mar. 25, 1991

Related U.S. Application Data

[63] Continuation-in-part of Ser. No. 379,921, Jul. 14, 1989, Pat. No. 5,036,389, and a continuation-in-part of Ser. No. 390,073, Aug. 7, 1989, Pat. No. 5,101,267.

[51] Int. Cl.$^6$ .................................................. H04N 7/14
[52] U.S. Cl. ............................. 348/13; 455/2; 455/6.2
[58] Field of Search ........................ 358/84, 86; 455/3.2, 455/4.1, 4.2, 5.1, 6.1, 6.3; 348/1, 13, 10

[56] References Cited

U.S. PATENT DOCUMENTS

| | | | |
|---|---|---|---|
| 4,506,383 | 3/1985 | McGann | 455/17 |
| 4,591,906 | 5/1986 | Morales-Garza et al. | 358/84 |
| 4,630,108 | 12/1986 | Gomersall | 358/84 |
| 4,750,036 | 6/1988 | Martinez | 348/4 |
| 4,897,714 | 1/1990 | Ichise et al. | 455/5.1 X |
| 4,926,256 | 5/1990 | Nanba | 358/84 |
| 4,945,563 | 7/1990 | Horton et al. | 358/84 |
| 5,041,972 | 8/1991 | Frost | 358/84 |
| 5,051,822 | 9/1991 | Rhoades | 358/86 |
| 5,237,688 | 8/1993 | Calvert et al. | 395/700 |
| 5,327,554 | 7/1994 | Palazzi, III et al. | 348/13 |

*Primary Examiner*—Edward F. Urban
*Attorney, Agent, or Firm*—Laurence R. Brown

[57] ABSTRACT

A wide range interactive two way communication video system operable nation-wide over satellite links has comprehensive local data processing stations for network subscribers that give a wide range of choices for customizing system features. In particular the system is soft-ware controlled by a programmable computer that comprehensively interconnects one or more interactive features or modes of operation in a local subscriber's unit that may be licensed to or chosen by individual subscribers. Such optionally selected features include data bases, audience response, instantaneous purchase and billing, channel and program selections, restructuring of system operation, and video games. Multiple slot software capability for receiving chips, discs or other software storage units are provided for customizing data bases, fiscal transactions, access to network facilities and remote stations, operational menus and program selection menus from broadcast, and cable or satellite communications. Subscriber participation is done from an armchair by flicking a finger without interrupting the viewing of program materials, without telephone lines or writing implements. A typical interactive transaction would be instantaneous response to an advertisement in a video broadcast program with a purchase decision which orders a product or service, pays, ships and reorders into inventory the product at different local sites in far-off cities.

10 Claims, 5 Drawing Sheets

SOFTWARE CONTROLLED MULTI-MODE INTERACTIVE TV SYSTEMS

This is a continuation in part of my applications Ser. No. 07/379,921 filed Jul. 14, 1989 for Satellite Controlled Audience Polling System now U.S. Pat. No. 5,036,389, Jul. 30, 1991 and Ser. No. 07/390,073 filed Aug. 7, 1989 for Wireless Communication from the Response Unit to a National Central Location now U.S. Pat. No. 5,101,267, Mar. 31, 1992.

FIELD OF THE INVENTION

This invention relates to television systems and more particularly it relates to two-way communicating interactive television systems which permit user intervention and participation.

BACKGROUND OF THE INVENTION

Audience participation television systems with two way communication are well known. Exemplary is U.S. Pat. No. 4,591,906, May 27, 1986 for Wireless Transmission from the Television Set to the Television Station. This system provides for instantaneous audience response to questions contained in television program pictures that may be processed from very large audiences of millions of subscribers on line in real time at a central processing station, typically at a TV transmitter station. Provisions were made for identifying each of about 29 million individual subscribers with narrow band unmodulated r-f beep signals within the range of a television broadcast signal so that this system is well adapted for a large city environment.

In the above identified co-pending applications, herein contained in entirety by reference, the local TV station transmission area audience participation was extended nationwide by means of processing audience response signals over satellite links. This was possible because there was no need to store and recall data, and no telephone lines were used with their system switching and limited peak load capacity bottlenecks, making them incapable of processing a nationwide audience instantaneously. Thus on-line real-time audience responses to polls with instantaneous nationwide audience surveys are made possible. These systems also are most advantageous in providing armchair responses without interruption to viewing of a program so that impulse voting and purchase decisions without afterthought was made feasible. This was achieved by means of a remote controlled cursor positioning control unit that positioned the cursor at a particular voting position on a television picture screen menu format. Computers at the local response units were operable to precisely define, time and transmit answers and to process therewith such other information as subscriber identification. The remote control units were further used for other functions such as channel switching, VCR unit operation and manipulation of television set controls such as loudness, etc.

Prior art audience participation systems in general were single purpose systems in that they controlled data such as votes in response to polls or kept TV set operating history for periodic billing purposes However, occasionally an auxiliary audience interactive feature was provided such as playing of video games, as shown in U. S. Pat. No. 4,630,108 for Preprogrammed Over-the-air Marketing Research System, Dec. 16, 1986, E. R. Gomersall. However in such systems, any satellite communication features were limited to conventional broadcast of TV programs, and telephone systems were necessary to relay stale stored participation and operation data off-line.

Thus such prior art systems have not been able to provide either real time instantaneous purchases, voting, communication or comprehensive interactive by audiences.

Furthermore prior art systems have not been versatile enough to provide customized participation features for the particular interests and financial capacities of a wide range of subscribers.

Accordingly it is a general objective of this invention to provide improved comprehensive interactive TV systems having instantaneous on-line nationwide communication capabilities.

It is a further object of the invention to provide customized interactive TV systems providing a variety of optional features for manual control of a subscriber and a choice of system features.

DISCLOSURE OF THE INVENTION

In accordance with this invention a local data processing station of a network subscriber controls video signals, local system operational modes and interactive communications of a range of participating activities available for subscriber interaction. Thus, a television receiver with program control means and channel selection means has a remote control unit for manual control and interaction with the network and television receiver from an armchair position without diverting attention away from the TV video display screen upon which programs are viewed as well as selection menus for audience participation voting, selection of system functions and program options, etc.

A programmable computer is interconnected with the local subscriber station TV receiver and the computer program control means comprises software computer program control means, preferably in the form of replaceable data storage units such as read only memory chips, thereby to establish a variety of communication and program options available to the subscriber for interactive control and participation in a way the licensing and charging is easily administered.

Radio wave transmission means for sending and receiving information over the network provides for satellite communication of instantaneous response communications in digital form in narrow band r-f wave beep digital signal format transmitted as audience response signals over a satellite communication channel to a nationwide audience in such a manner that many millions of participants can participate instantaneously without intermediate storage of data or responses or waits and bottlenecks that discourage participation.

Thus, a network of interconnected interactive communication stations and local viewing options are interconnected for instant armchair control and accessibility to the limited extent permitted by restrictive software programming of local computer controlled system configuration at the subscriber's local stations. The interaction and control is related to various system configurations and modes of operation and corresponding menu displays on the video screen for expediting manual control by placing a cursor at a selected option on a menu displayed on the video screen.

Accordingly a wide range of optional operational modes and interaction functions are available on a subscription basis to match the interests ahd finances of the individual subscribers. Included in the interactive participation features available from this system are features such as instantaneous impulse purchase transactions with immediate payment, delivery, bookkeeping, inventory control and restocking at various locations over the nation, all automatically initiated with a flick of a finger from an armchair viewing position without interruption of attention from the TV video screen. The purchaser may be identified and a credit card or bank transaction completed electronically without intervening voice or written communication. Similarly video games may be played, data banks accessed, programs selected, historical operation of the TV set recorded, available current program availabilities consulted, VCRs controlled and various other interactive participation and system features now available and offered in the future offered for optional control by audience participation.

Further objects, features and advantages of the invention will be found throughout the following more detailed description of a preferred embodiment of the invention and its manner of construction as well as the accompanying drawings and claims.

BRIEF DESCRIPTION OF THE DRAWINGS

In the accompanying drawings wherein like reference characters represent similar features, and primed reference characters indicate variations in the features, throughout the several views.

THE PREFERRED EMBODIMENT

Figure 1:
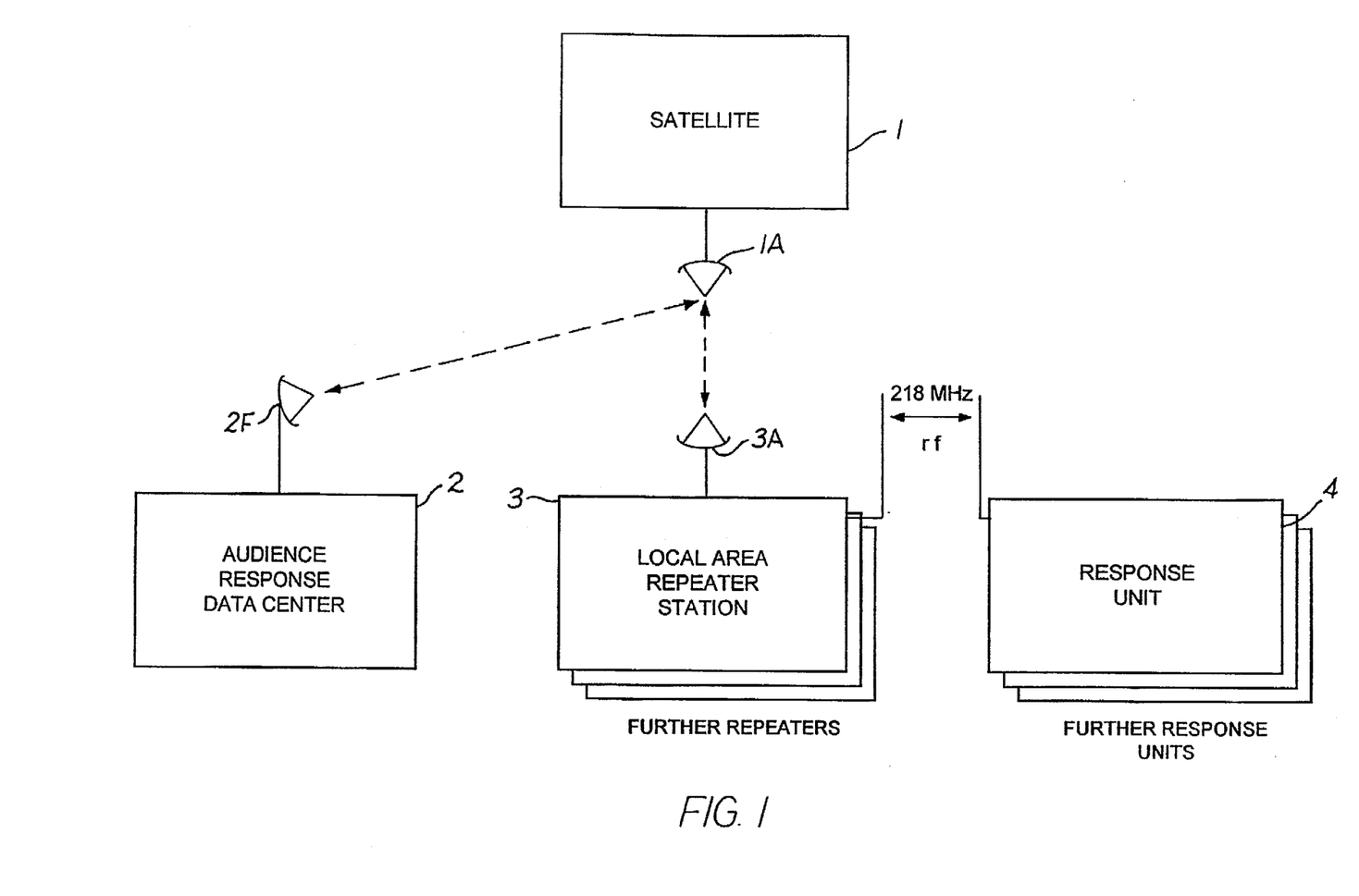
FIG. 1 is a block diagram of a wide area TV audience response system afforded by the invention.

In operation of the customized interactive video subscriber's stations afforded by this invention, nationwide two-way communication networks are afforded by means of satellite communications identified in FIG. 1, and more fully disclosed in the aforesaid parent applications. Thus a family of local subscriber's units or stations 4 communicate with a local area repeater station 3 over a narrow band 128 MHz r-f wave link in the manner identified in the aforementioned U.S. Pat. No. 4,591,906. One or more local area repeater stations 3 then are linked via satellite 1 and directional antennas 1A, 3A and 2F to the remote station, here identified as audience response data center 2, at which audience responses nationwide may be assembled and retransmitted nationwide instantaneously in response to queries implicitly contained in program materials, for example. This network of interacting subscriber stations is characterized by two-way communication capabilities, wherein each subscriber nation-wide is identified individually for fiscal charges or audience analysis purposes. The audience response may be an answer to a poll question or a purchase of an advertised item.

Figure 2:
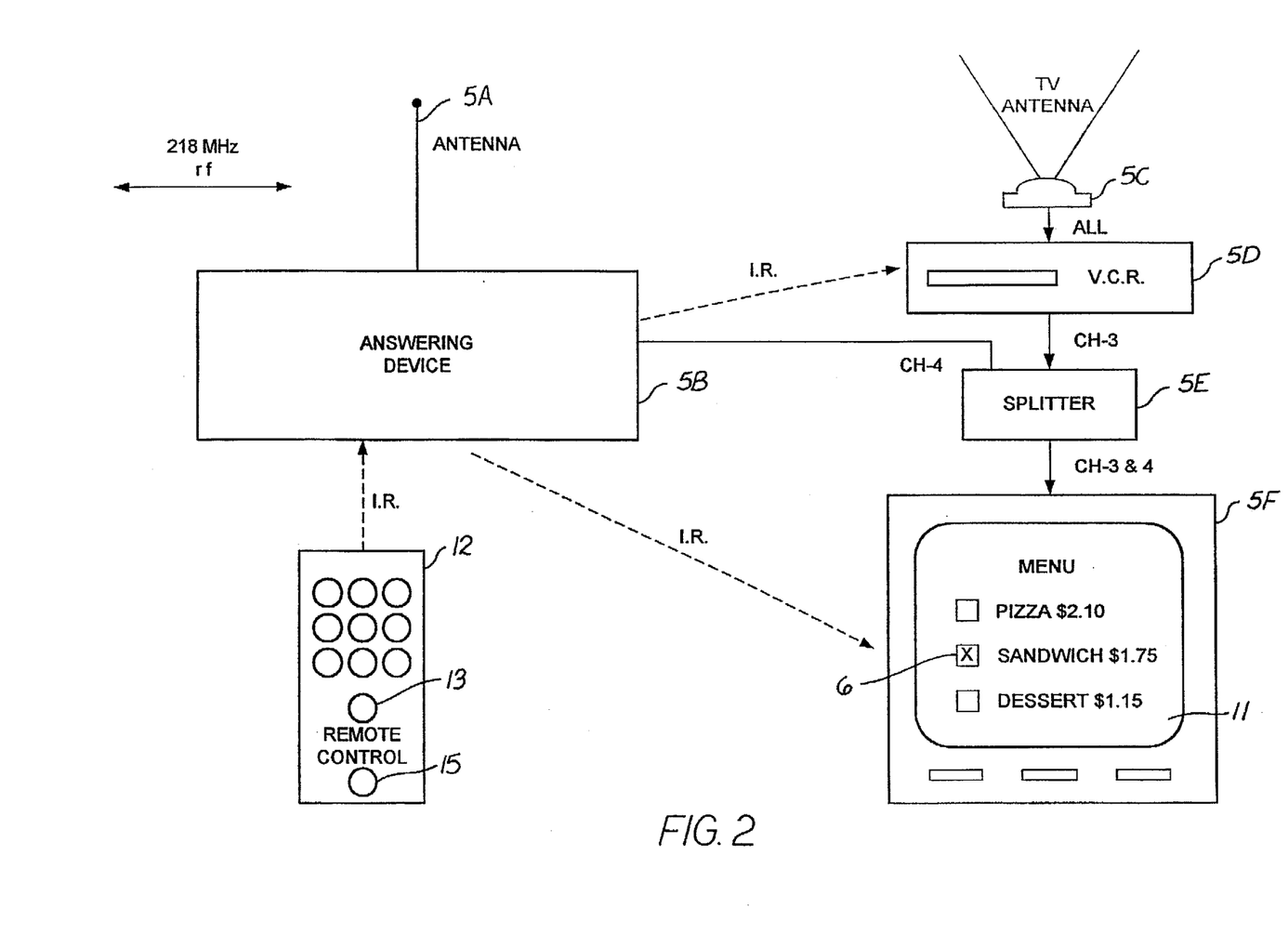
FIG. 2 is a block diagram of a local response unit station at a subscriber's location for audience response by means of cursor positioning On the TV video display screen.

At the local subscriber's unit, some of the system and local interaction features are illustrated in FIG. 2. Note the two parallel communication means, namely, (1) the antenna 5A for the responsive beeps or equivalent communications initiated by subscriber manual control, and (2) the TV antenna 5C or equivalent cable system that provides a plurality of program channel choices for the local TV receiver 5F and input messages from the network carried on existing programming materials. Thus, responses may be simultaneously transmitted from the answering device 5B while the TV screen is being viewed without interruption, phone calls or moving from an armchair viewing site by means of the remote control device 12, which as shown intercommunicates by means if infrared (I.R.) wireless links with the answering device 5B, the TV receiver 5F, the V.C.R. 8D and other interactive system units or control centers. The answering device may be that described in the U.S. Pat. 4,591,906, for example.

The remote control unit 12 is operable in accordance with this invention to control the position and function of a cursor 6 on the video viewing screen 11, such as by means of a joystick control member 13. A decision, vote or purchase may be made and recorded by means of the selection pushbutton switch 15. Thus when the menu displayed on screen 11 from another subscriber in the form of an advertisement in a regularly programmed video program or otherwise, the cursor 6 is positioned at a video screen selection site and a transaction made by means of subscriber controlled manual control means 12 and its joystick 13 and selector 15. Various active menus may be locally generated together with local system operating modes for interaction as explained in more detail hereinafter.

The splitter 5E, or other equivalent switching means, provides a choice of programs and local system units such as disc players (not shown) for independent use or selection on the TV receiver 5F by its conventional tuning means, with or without the aid of the keyboard on remote control unit 12.

In accordance with this invention, as better seen by reference to FIG. 3, a wide range of subscriber interaction, participation and control is made feasible by the software (8) controlled programmable microprocessor data processing system 27, which is later shown in more detail. The software controlled computer data processing system comprises a computer directed control system providing local station organization and operation in different operating modes. Thus such customized interactive features as network communication, menu selections, program viewing options including channel selections, processing of bank and fiscal transactions with credit and payment for purchases, audience response, data processing from data banks and local historical records with the video screen serving as the computer monitor, and a wide variety of other interactive functions useful to a local subscriber can be supplied from a standard low cost facility by means of software control.

This software control feature systemwise permits the use of a software disk, chip or card to define and customize those licensed activities that individual subscribers order. It can identify the subscriber, a bank account or credit card that permits instant purchase transactions completed on impulse instantaneously without moving from an armchair, writing or telephoning. It can organize a computer controlled local system into many different configurations and modes of operation so that a wider range of interactivity by the subscriber is made affordable with standardized but highly flexible low cost equipment.

Figure 3:
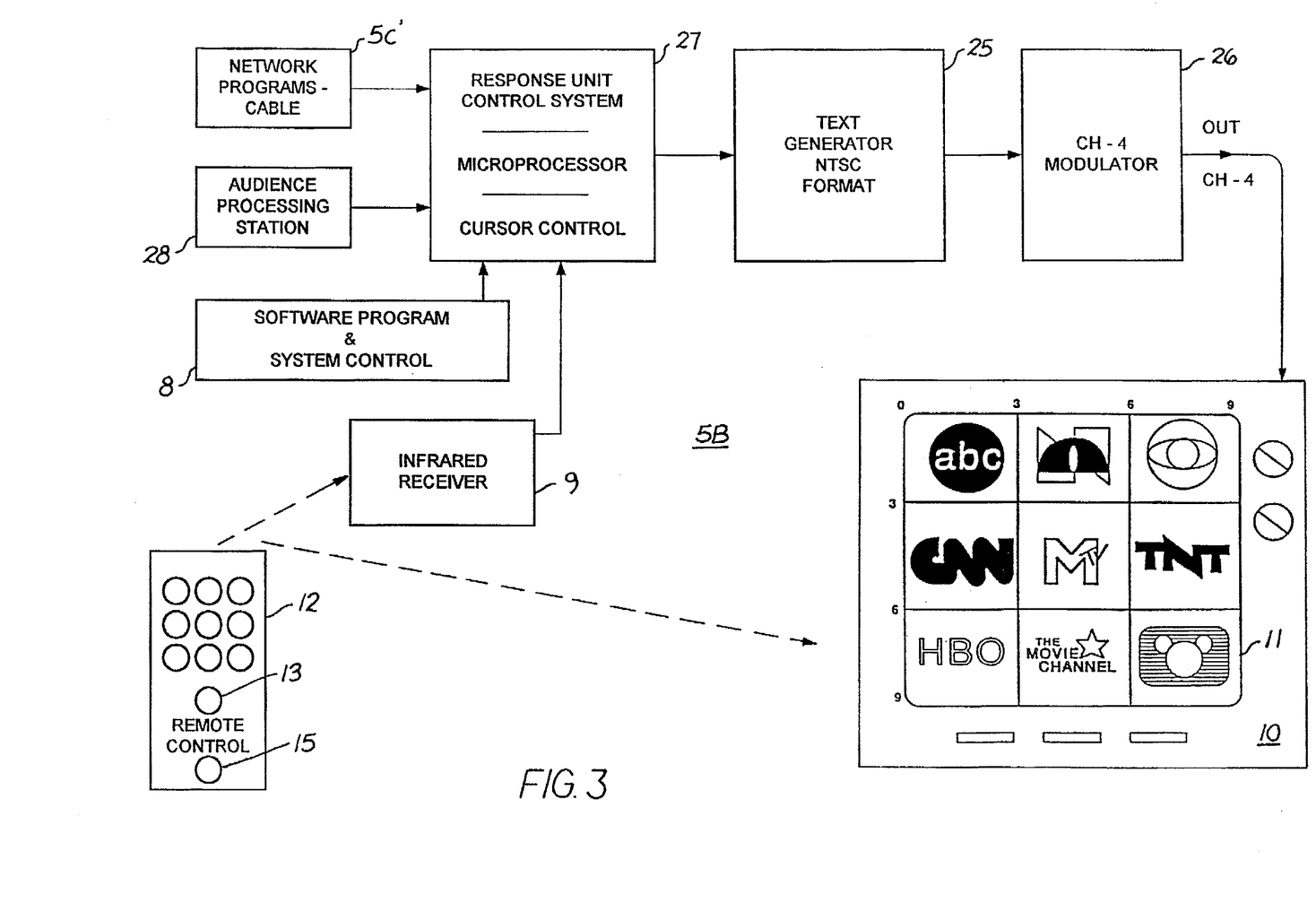
FIG. 3 is a further local response unit subscriber station block diagram illustrating customized control of interaction features by means of software program and system control means.

Returning to the details of the system of FIG. 3, generally identified as the 5B answering device, the parallel nature of the program sources 5C' and the two-way communications through the audience processing channel 25 is shorn as communicating with the response unit control system and microprocessor 27. Local video text for menus 11, such as shown on the Video screen are generated in NTSC format for U.S. standard television receivers at 25 and presented by way of modulator 26 on a selected interactive television processing channel to which the television receiver 10 and remote control unit 12 is responsive, such as channel four. Thus, this invention provides, for at least specified modes of operation, menus for interactive choices of the subscriber by means of location of a cursor at a menu choice location.

This particular menu presents a universal format for selecting television network programs without identification of local channel numbers, for example, which can change from county to county on separate cable systems or with local cities with radio wave broadcast from different channels. Thus, an interactive feature of this invention is the provision of channel selection as one of the interactive modes of operation. In this particular illustrated menu version of channel selection, it may be seen for example that an out of town visitor in a hotel does not know what local channel is allocated to CNN or what cable channel is allocated to HBO. Thus those channels may be selected simply and without reference to a channel guide by locating a cursor at the appropriate menu position and operating selection switch 15 for automatic system selection of that channel. The coordinates on screen 7 are shown to identify nine different menu zones available in this embodiment.

Figure 4:
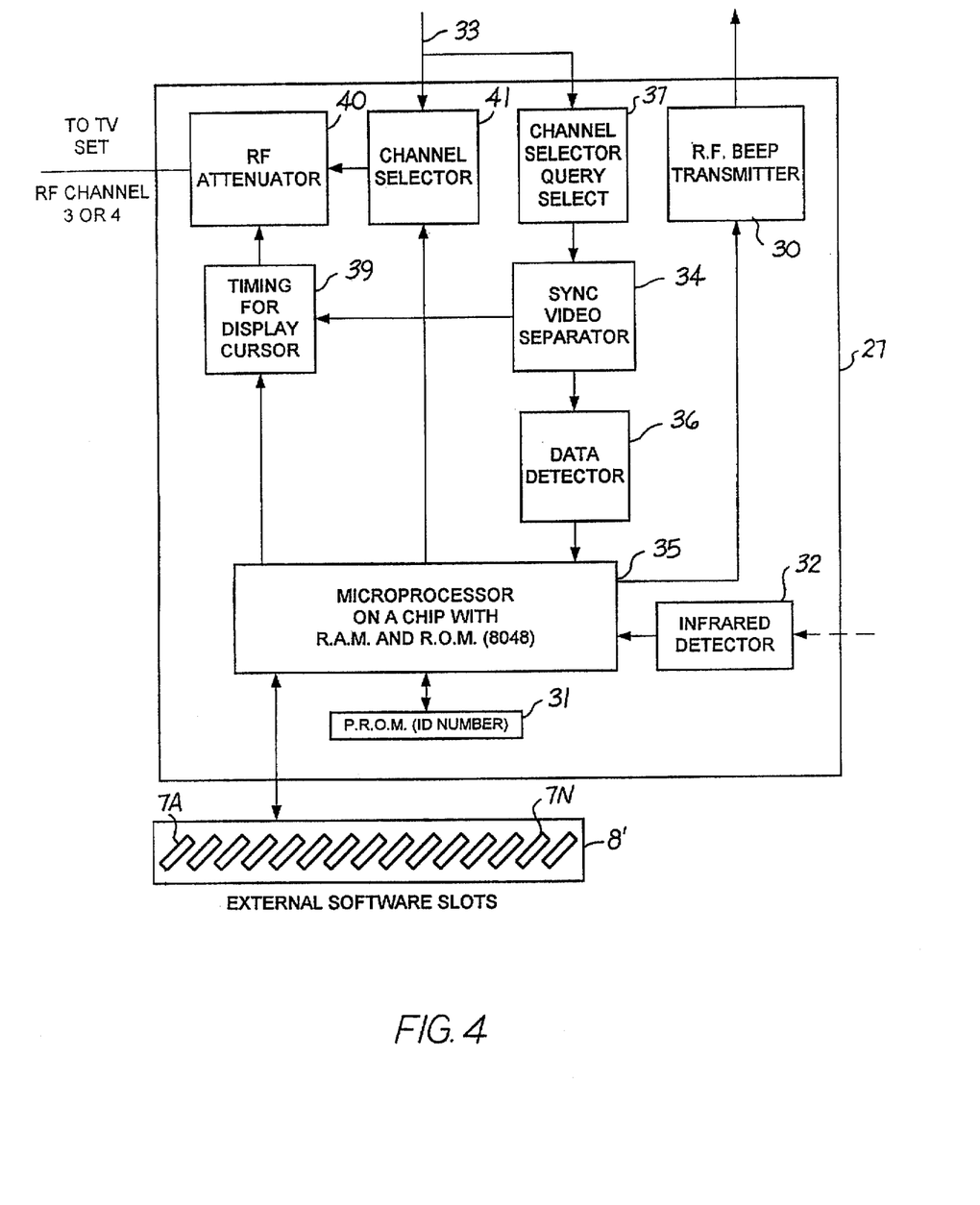
FIG. 4 is a block diagram in more detail of the software control system afforded by this invention.

The channel selection feature is shown in more detail in FIG. 4 illustrating the relationship of the cursor control technique feature unique in this interactive television system and its interaction with the channel selection function. The control system block 27 (FIG. 3) is also related to the radio frequency beep transmitter 30 for network communication from the local subscriber station. Note that the software item P.R.O.M. 31 read only memory card or unit identifies the subscriber uniquely in the network beep signals. Also note that external software 8' has a plurality of slots 7A, 7N provided for receiving memory cards or discs that appropriately control the microprocessor 35 for organizing the control of the system, and the accessibility to the system by the subscriber based upon contract provisions or payment schedules, etc. Some software storage units 7 can be random access (R.A.M.) and some may be read only (R.O.M.). The latter could be used for compiling historical data for audience analysis or billing purposes, for example. The R.O.M. units would include credit and banking restrictions for purchases or other fiscal transactions. Any restricted access features that involve costs or charges or license fees, etc. are thus controlled. Also this provides a medium by which the entire system configuration based upon the computer control system can be dynamically reconfigured from time to time to add or change features and to introduce new menus. This software-computer control configuration then truly provides a unique and versatile customizable interactive television system.

Figure 5:
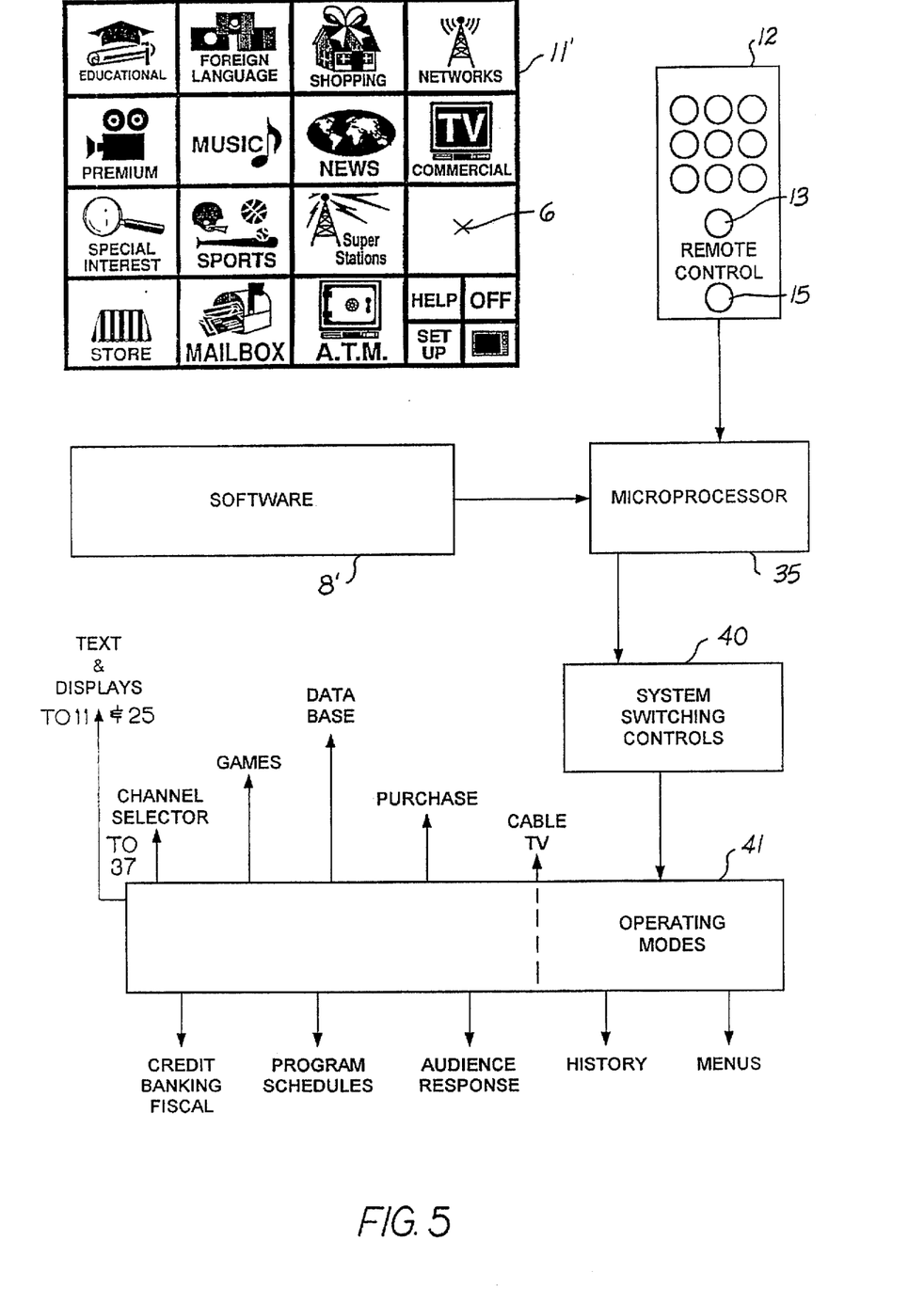
FIG. 5 is a functional operation diagram illustrating typical customized control of interactive features by means of computer programming software in accordance with this invention.

Incoming program signals at line 33 can carry return signals from the two-way communication capabilities of this system in the form of queries or other communications identifiable to flag audience response polls, etc. In general all timing is synchronized at 34 with the video sync signals to assure that cursor timing 39 and positioning on a picture raster is coordinated with the questions asked on the program picture, etc. Data detector 36.then processes the digital beep signals either implicit in the picture video or separately available at the query select means 37, which might for example be confined to particular incoming channels. The channel selector 41 is controlled by the microprocessor controlled control system such as by means of a software program for microprocessor Functional operational features for customizing the interaction facilities and programs for the subscriber are set out in the block diagram configuration of FIG. 5, as related to the menu 11'. This menu comprises a program selection menu, where programs relating to various themes may be selected, based upon stored information, that may be updated daily for example, about the times that scheduled concerts, games, movies, etc. are available. Thus, for example the optional choice of any box would bring up a more detailed menu for selection of an available channel, program or feature, either instantaneously or at the future time it appears, with the possibility of recording it on a VCR. The "store" option for example may include catalog shopping features from several commercial subscribers.

The interaction between the software programs 8', the microprocessor 35 and system switching controls 40 to implement various operating modes 41 is illustrated. Thus for example video games such as chess, etc. may be played, a data base may be viewed or read, direct line banking transactions initiated, and the like. A basic system, for example, could provide audience response, purchase transaction and program selection modes of operation, with other features and system access being available at extra cost and configurated only by means of special unexpired software storage unit which could be employed in one or more of the slots (FIG. 4).

Having therefore improved the nature of the art by providing a customized interactive video system with nationwide two-way communication capabilities, those features of novelty defining the spirit and nature of this invention are defined with particularity in the following claims.

I claim:

1. A local subscriber's data processing station for a wireless television program communication network coupling together a set of interactive subscriber television receiver stations, comprising in combination, an operation control system in said data processing station for controlling video signals, system operating modes and interactive communications available to the subscriber, a television receiver with a video display screen, program control means and television program channel selection means, a plurality of sources of video text and television program channels available from said network for individual presentation on said display screen in response to operator control by way of said operation control system, a programmable computer interconnected with said television receiver and said operation control system, radio wave transmission and reception means for sending and receiving video and interactive control signal information wirelessly to and from the subscriber television receiver stations in said network including messages with subscriber identification, video text and control signals for said television receiver, said operation control system providing local station organization and operation in different operating modes permitting various degrees of interactive participation by a local subscriber, including network communication interconnection between the subscriber television receiver stations, television program viewing options, fiscal transactions and audience response modes, subscriber manual control means for interactive participation and operation of said operation control system over an authorized range of optional features, monitoring means for generating video displays of instructions and interactive menus on said video screen related to said operating modes, self contained software programs operable with said operation control system at the subscriber's data processing station for identifying program and operating mode options individually authorized to the subscriber for controlling the local station options by means of said software programs, replaceable software means located at the subscriber station for storing at least one replaceable software control program defining authorized operating conditions for that station, and operating means for programming said computer with said software control program to establish optional operating mode conditions authorized to said subscriber at the local data processing station as defined by the software control program.

2. The local data processing station as defined in claim 1 further comprising interactive selection means for establishing optionally a set of selectable interactive operation features identified by software programs stored on said replaceable software means.

3. The local data processing station as defined in claim 2 wherein at least one replaceable software program comprises a stored data base accessible for viewing on said video display screen in response to said subscriber manual control means.

4. The local data processing station as defined in claim 2 wherein at least one replaceable software program authorizes a video game for display on said video display screen.

5. The local data processing station as defined in claim 2 wherein the interactive selection means further comprises means for operating the system in a manual control purchase authorization mode for authorizing purchases in response to data displayed upon said video display screen, wherein at least one replaceable software means comprises credit authorization data for payment for purchases authorized by said manual control purchase authorization means.

6. The local data processing station as defined in claim 5 further comprising means operable under control of said replaceable software means and said operation control system for network interconnection to place and confirm an order in the purchase authorization mode with a remote station coupled into said network of interactive subscriber stations in response to said manual control purchase authorization.

7. The local data processing station as defined in claim 6 further comprising means under control of said replaceable software means for indicating acknowledging of shipment of an order from a remote station coupled into said network of interactive subscriber stations in real time in response to a manual control purchase authorization transaction at said local subscriber's station.

8. A local subscriber's data processing station for a wireless television program communication network coupling together a set of interactive subscriber television receiver stations, comprising in combination, an operation control system in said data processing station for controlling video signals, system operating modes and interactive communications available to the subscriber, a television receiver with a video display screen, program control means and television program channel selection means, a plurality of sources of video text and television program channels available from said network for individual presentation on said display screen in response to operator control by way of paid operation control system, a programmable computer interconnected with said television receiver and said operation control system, radio wave transmission and reception means for sending and receiving video and interactive control signal information wirelessly to and from the subscriber television receiver stations in said network including messages with subscriber identification, video text and control signals for said television receiver, said operation control system providing local station organization and operation in different operating modes permitting various degrees of interactive participation by a local subscriber, including network communication interconnection between the subscriber television receiver stations, television program viewing options, fiscal transactions and audience response modes, subscriber manual control means for interactive participation and operation of said operation control system over an authorized range of optional features, monitoring means for generating video displays of instructions and interactive menus on said video screen related to said operating modes, self contained software programs operable with said operation control system at the subscriber's data processing station for identifying program and operating mode options individually authorized to the subscriber for controlling the local station options by means of said software programs, means responsive to said self contained software for establishing a mode of operation for selection of one of a plurality of authorized television program channels wherein a channel selection menu identifying authorized channels is displayed automatically on said video screen, means establishing a first menu directed to different interactively selectable program theme subsets available from said authorized television program channels and means for causing selected themes to automatically display a second menu displaying available television programs relating to that selected theme, means responsive to said subscriber manual control means for selecting a preferred theme from said different themes presented when said first menu is displayed on said screen, and means in said control system for identifying on said second menu said television programs available relating to the selected theme.

9. A local subscriber's data processing station for a wireless television program communication network coupling together a set of interactive subscriber television receiver stations, comprising in combination, an operation control system in said data processing station for controlling video signals, system operating modes and interactive communications available to the subscriber, a television receiver with a video display screen, program control means and television program channel selection means, a plurality of sources of video text and television program channels available from said network for individual presentation on said display screen in response to operator control by way of said operation control system, a programmable computer interconnected with said television receiver and said operation control system, radio wave transmission and reception means for sending and receiving video and interactive control signal information wirelessly to and from the subscriber television receiver stations in said network including messages with subscriber identification, video text and control signals for said television receiver, said operation control system providing local station organization and operation in different operating modes permitting various degrees of interactive participation by a local subscriber, including network communication interconnection between the subscriber television receiver stations, television program viewing options, fiscal transactions and audience response modes, subscriber manual control means for interactive participation and operation of said operation control system over an authorized range of optional features, monitoring means for generating video displays of instructions and interactive menus on said video screen related to said operating modes, self contained software programs operable with said operation control system at the subscriber's data processing station for identifying program and operating mode options individually authorized to the subscriber for controlling the local station options by means of said software programs, means controlled by replaceable software means operable with said operation control system for establishing and controlling a mode of operation that records historical operating data of the local subscriber's data processing station.

10. A local subscriber's data processing station for a wireless television program communication network coupling together a set of interactive subscriber television receiver stations, comprising in combination, an operation control system in said data processing station for controlling video signals, system operating modes and interactive communications available to the subscriber, a television receiver with a video display screen, program control means and television program channel selection means, a plurality of sources of video text and television program channels available from said network for individual presentation on said display screen in response to operator control by way of said operation control system, a programmable computer interconnected with said television receiver and said operation control system, radio wave transmission and reception means for sending and receiving video and interactive control signal information wirelessly to and from the subscriber television receiver stations in said network including messages with subscriber identification, video text and control signals for said television receiver, said operation control system providing local station organization and operation in different operating modes permitting various degrees of interactive participation by a local subscriber, including network communication interconnection between the subscriber television receiver stations, television program viewing options, fiscal transactions and audience response modes, subscriber manual control means for interactive participation and operation of said operation control system over an authorized range of optional features, monitoring means for generating video displays of instructions and interactive menus on said video screen related to said operating modes, self contained software programs operable with said operation control system at the subscriber's data processing station for identifying program and operating mode options individually authorized by means of said software programs, means controlled by replaceable software means operable with said operator control system for establishing and controlling fiscal transactions with a further local station in said network of interactive communications, and means for establishing an accounting mode of operation for maintaining and reporting fiscal transactions incurred in the operation of the local subscriber's data processing station.

* * * * *

US005663757C1

(12) EX PARTE REEXAMINATION CERTIFICATE (9180th)

United States Patent
Morales (10) Number: US 5,663,757 C1
(45) Certificate Issued: Aug. 14, 2012

(54) SOFTWARE CONTROLLED MULTI-MODE INTERACTIVE TV SYSTEMS

(75) Inventor: Fernando Morales, Reston, VA (US)

(73) Assignee: EON Corporation, Tyler, TX (US)

Reexamination Request:
No. 90/011,695, May 17, 2011

Reexamination Certificate for:
Patent No.: 5,663,757
Issued: Sep. 2, 1997
Appl. No.: 07/674,169
Filed: Mar. 25, 1991

Related U.S. Application Data

(63) Continuation-in-part of application No. 07/390,073, filed on Aug. 7, 1989, now Pat. No. 5,101,267, and a continuation-in-part of application No. 07/379,921, filed on Jul. 14, 1989, now Pat. No. 5,036,389.

(51) Int. Cl.
*H04N 7/14* (2006.01)

(52) U.S. Cl. .................... 725/5; 348/E7.07; 348/E7.019; 348/E7.033; 348/E7.034; 725/22; 725/24; 725/40; 725/45; 725/56; 725/60; 725/65

(58) Field of Classification Search ......................... None
See application file for complete search history.

(56) References Cited

To view the complete listing of prior art documents cited during the proceeding for Reexamination Control Number 90/011,695, please refer to the USPTO's public Patent Application Information Retrieval (PAIR) system under the Display References tab.

*Primary Examiner* — Joshua Campbell (57) ABSTRACT

A wide range interactive two way communication video system operable nation-wide over satellite links has comprehensive local data processing stations for network subscribers that give a wide range of choices for customizing system features. In particular the system is soft-ware controlled by a programmable computer that comprehensively interconnects one or more interactive features or modes of operation in a local subscriber's unit that may be licensed to or chosen by individual subscribers. Such optionally selected features include data bases, audience response, instantaneous purchase and billing, channel and program selections, restructuring of system operation, and video games. Multiple slot software capability for receiving chips, discs or other software storage units are provided for customizing data bases, fiscal transactions, access to network facilities and remote stations, operational menus and program selection menus from broadcast, and cable or satellite communications. Subscriber participation is done from an armchair by flicking a finger without interrupting the viewing of program materials, without telephone lines or writing implements. A typical interactive transaction would be instantaneous response to an advertisement in a video broadcast program with a purchase decision which orders a product or service, pays, ships and reorders into inventory the product at different local sites in far-off cities.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7-10 are determined to be patentable as amended.

Claim 2-6, dependent on an amended claim, are determined to be patentable.

1. A local subscriber's data processing station for a wireless television program communication network coupling together a set of interactive subscriber television receiver stations, comprising in combination,
an operation control system in said data processing station for controlling video signals, system operating modes and interactive communications available to the subscriber,
a television receiver with a video display screen, program control means and television program channel selection means,
a plurality of sources of video text and television program channels available from said network for individual presentation on said display screen in response to operator control by way of said operation control system,
a programmable computer interconnected with said television receiver and said operation control system,
radio wave transmission and reception means for sending and receiving video and interactive control signal information wirelessly to and from the subscriber television receiver stations in said network including messages with subscriber identification, video text and control signals for said television receiver,
said operation control system providing local station organization and operation in different operating modes permitting various degrees of interactive participation by a local subscriber, including network communication interconnection between the subscriber television receiver stations, television program viewing options, fiscal transactions and audience response modes,
subscriber manual control means for interactive participation and operation of said operation control system over an authorized range of optional features,
monitoring means for generating video displays of instructions and interactive menus on said video screen related to said operating modes,
self contained software programs operable with said operation control system at the subscriber's data processing station for identifying program and operating mode options individually authorized to the subscriber for controlling the local station options by means of said software programs,
replaceable software means located at the subscriber station for storing at least one replaceable software control program defining authorized operating conditions for that station, and operating means for programming said computer with said software control program to establish optional operating mode conditions authorized to said subscriber at the local data processing station as defined by the software control program, *and*
*means controlled by said replaceable software means operable with said operation control system for reconfiguring the operating modes by adding or changing features and introducing new menus.*

7. [The local data processing station as defined in claim 6 further comprising] *A local subscriber's data processing station for a wireless television program communication network coupling together a set of interactive subscriber television receiver stations, comprising in combination,*
*an operation control system in said data processing station for controlling video signals, system operating modes and interactive communications available to the subscriber,*
*a television receiver with a video display screen, program control means and television program channel selection means,*
*a plurality of sources of video text and television program channels available from said network for individual presentation on said display screen in response to operator control by way of said operation control system,*
*a programmable computer interconnected with said television receiver and said operation control system,*
*radio wave transmission and reception means for sending and receiving video and interactive control signal information wirelessly to and from the subscriber television receiver stations in said network including messages with subscriber identification, video text and control signals for said television receiver,*
*said operation control system providing local station organization and operation in different operating modes permitting various degrees of interactive participation by a local subscriber, including network communication interconnection between the subscriber television receiver stations, television program viewing options, fiscal transactions and audience response modes,*
*subscriber manual control means for interactive participation and operation of said operation control system over an authorized range of optional features,*
*monitoring means for generating video displays of instructions and interactive menus on said video screen related to said operating modes,*
*self contained software programs operable with said operation control system at the subscriber's data processing station for identifying program and operating mode options individually authorized to the subscriber for controlling the local station options by means of said software programs,*
*replaceable software means located at the subscriber station for storing at least one replaceable software control program defining authorized operating conditions for that station, and operating means for programming said computer with said software control program to establish optional operating mode conditions authorized to said subscriber at the local data processing station as defined by the software control program,*
*interactive selection means for establishing optionally a set of selectable interactive operation features identi-* fied by software programs stored on said replaceable software means, wherein the interactive selection means further comprises means for operating the system in a manual control purchase authorization mode for authorizing purchases in response to data displayed upon said video display screen, wherein at least one replaceable software means comprises credit authorization data for payment for purchases authorized by said manual control purchase authorization means, means operable under control of said replaceable software means and said operation control system for network interconnection to place and confirm an order in the purchase authorization mode with a remote station coupled into said network of interactive subscriber stations in response to said manual control purchase authorization, and means under control of said replaceable software means for indicating acknowledging of shipment of an order from a remote station coupled into said network of interactive subscriber stations in real time in response to a manual control purchase authorization transaction at said local subscriber's station.

8. A local subscriber's data processing station for a wireless television program communication network coupling together a set of interactive subscriber television receiver stations, comprising in combination, an operation control system in said data processing station for controlling video signals, system operating modes and interactive communications available to the subscriber, a television receiver with a video display screen, program control means and television program channel selection means, a plurality of sources of video text and television program channels available from said network for individual presentation on said display screen in response to operator control by way of paid operation control system, a programmable computer interconnected with said television receiver and said operation control system, radio wave transmission and reception means for sending and receiving video and interactive control signal information wirelessly to and from the subscriber television receiver stations in said network including messages with subscriber identification, video text and control signals for said television receiver, said operation control system providing local station organization and operation in different operating modes permitting various degrees of interactive participation by a local subscriber, including network communication interconnection between the subscriber television receiver stations, television program viewing options, fiscal transactions and audience response modes, subscriber manual control means for interactive participation and operation of said operation control system over an authorized range of optional features, monitoring means for generating video displays of instructions and interactive menus on said video screen related to said operating modes, self contained software programs operable with said operation control system at the subscriber's data processing station for identifying program and operating mode options individually authorized to the subscriber for controlling the local station options by means of said software programs, means responsive to said self contained software for establishing a mode of operation for selection of one of a plurality of authorized television program channels wherein a channel selection menu identifying authorized channels is displayed automatically on said video screen, means establishing a first menu directed to different interactively selectable program theme subsets available from said authorized television program channels and means for causing selected themes to automatically display a second menu displaying available television programs relating to that selected theme, means responsive to said subscriber manual control means for selecting a preferred theme from said different themes presented when said first menu is displayed on said screen, and means in said control system for identifying on said second menu said television programs available relating to the selected theme, *and*

*means controlled by replaceable software means operable with said operation control system for reconfiguring the operating modes by adding or changing features and introducing new menus*.

9. A local subscriber's data processing station for a wireless television program communication network coupling together a set of interactive subscriber television receiver stations, comprising in combination, an operation control system in said data processing station for controlling video signals, system operating modes and interactive communications available to the subscriber, a television receiver with a video display screen, program control means and television program channel selection means, a plurality of sources of video text and television program channels available from said network for individual presentation on said display screen in response to operator control by way of said operation control system, a programmable computer interconnected with said television receiver and said operation control system, radio wave transmission and reception means for sending and receiving video and interactive control signal information wirelessly to and from the subscriber television receiver stations in said network including messages with subscriber identification, video text and control signals for said television receiver, said operation control system providing local station organization and operation in different operating modes permitting various degrees of interactive participation by a local subscriber, including network communication interconnection between the subscriber television receiver stations, television program viewing options, fiscal transactions and audience response modes, subscriber manual control means for interactive participation and operation of said operation control system over an authorized range of optional features, monitoring means for generating video displays of instructions and interactive menus on said video screen related to said operating modes, self contained software programs operable with said operation control system at the subscriber's data processing station for identifying program and operating mode options individually authorized to the subscriber for controlling the local station options by means of said software programs, means controlled by replaceable software means operable with said operation control system for establishing and controlling a mode of operation that records historical operating data of the local subscriber's data processing station, *and reconfiguring the operating modes by adding or changing features and introducing new menus.*

10. A local subscriber's data processing station for a wireless television program communication network coupling together a set of interactive subscriber television receiver stations, comprising in combination, an operation control system in said data processing station for controlling video signals, system operating modes and interactive communications available to the subscriber, a television receiver with a video display screen, program control means and television program channel selection means, a plurality of sources of video text and television program channels available from said network for individual presentation on said display screen in response to operator control by way of said operation control system, a programmable computer interconnected with said television receiver and said operation control system, radio wave transmission and reception means for sending and receiving video and interactive control signal information wirelessly to and from the subscriber television receiver stations in said network including messages with subscriber identification, video text and control signals for said television receiver, said operation control system providing local station organization and operation in different operating modes permitting various degrees of interactive participation by a local subscriber, including network communication interconnection between the subscriber television receiver stations, television program viewing options, fiscal transactions and audience response modes, subscriber manual control means for interactive participation and operation of said operation control system over an authorized range of optional features, monitoring means for generating video displays of instructions and interactive menus on said video screen related to said operating modes, self contained software programs operable with said operation control system at the subscriber's data processing station for identifying program and operating mode options individually authorized by means of said software programs, means controlled by replaceable software means operable with said operator control system for establishing and controlling fiscal transactions with a further local station in said network of interactive communications, and means for establishing an accounting mode of operation for maintaining and reporting fiscal transactions incurred in the operation of the local subscriber's data processing station, *and reconfiguring the operating modes by adding or changing features and introducing new menus.*

* * * * *

(12) EX PARTE REEXAMINATION CERTIFICATE (9892nd)
United States Patent
Morales (10) Number: US 5,663,757 C2
(45) Certificate Issued: Oct. 21, 2013

(54) SOFTWARE CONTROLLED MULTI-MODE INTERACTIVE TV SYSTEMS

(75) Inventor: Fernando Morales, Reston, VA (US)

(73) Assignee: EON Corporation, Tyler, TX (US)

Reexamination Request:
No. 90/012,639, Sep. 14, 2012

Reexamination Certificate for:
Patent No.: 5,663,757
Issued: Sep. 2, 1997
Appl. No.: 07/674,169
Filed: Mar. 25, 1991

Reexamination Certificate C1 5,663,757 issued Aug. 14, 2012

Related U.S. Application Data (63) Continuation-in-part of application No. 07/390,073, filed on Aug. 7, 1989, now Pat. No. 5,101,267, and a continuation-in-part of application No. 07/379,921, filed on Jul. 14, 1989, now Pat. No. 5,036,389.

(51) Int. Cl.
*H04N 7/03* (2006.01)
*H04N 7/173* (2011.01)
*H04N 7/088* (2006.01)
*H04N 7/087* (2006.01)
*H04N 7/16* (2011.01)

(52) U.S. Cl.
USPC .................... 725/5; 348/E7.019; 348/E7.033; 348/E7.034; 348/E7.07; 455/22; 725/24; 725/40; 725/45; 725/56; 725/60; 725/65

(58) Field of Classification Search
None
See application file for complete search history.

(56) References Cited

To view the complete listing of prior art documents cited during the proceeding for Reexamination Control Number 90/012,639, please refer to the USPTO's public Patent Application Information Retrieval (PAIR) system under the Display References tab.

*Primary Examiner* — Eric B Kiss (57) ABSTRACT

A wide range interactive two way communication video system operable nation-wide over satellite links has comprehensive local data processing stations for network subscribers that give a wide range of choices for customizing system features. In particular the system is soft-ware controlled by a programmable computer that comprehensively interconnects one or more interactive features or modes of operation in a local subscriber's unit that may be licensed to or chosen by individual subscribers. Such optionally selected features include data bases, audience response, instantaneous purchase and billing, channel and program selections, restructuring of system operation, and video games. Multiple slot software capability for receiving chips, discs or other software storage units are provided for customizing data bases, fiscal transactions, access to network facilities and remote stations, operational menus and program selection menus from broadcast, and cable or satellite communications. Subscriber participation is done from an armchair by flicking a finger without interrupting the viewing of program materials, without telephone lines or writing implements. A typical interactive transaction would be instantaneous response to an advertisement in a video broadcast program with a purchase decision which orders a product or service, pays, ships and reorders into inventory the product at different local sites in far-off cities.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 7 is confirmed.

Claims 1-6 and 8-10 were not reexamined.

\* \* \* \* \*